United States Patent
DiSanto et al.

(10) Patent No.: US 7,254,232 B2
(45) Date of Patent: Aug. 7, 2007

(54) METHOD AND SYSTEM FOR SELECTING ENCRYPTION KEYS FROM A PLURALITY OF ENCRYPTION KEYS

(75) Inventors: Frank J. DiSanto, North Hills, NY (US); Denis A. Krusos, Lloyd Harbor, NY (US)

(73) Assignee: Copytele, Inc., Melville, NY (US)

( * ) Notice: Subject to any disclaimer, the term of this patent is extended or adjusted under 35 U.S.C. 154(b) by 1265 days.

(21) Appl. No.: 09/782,860

(22) Filed: Feb. 14, 2001

(65) Prior Publication Data

US 2002/0146118 A1    Oct. 10, 2002

(51) Int. Cl.
*H04K 1/06* (2006.01)

(52) U.S. Cl. .......................................... 380/37; 380/43
(58) Field of Classification Search ................ 380/274, 380/43, 262, 37
See application file for complete search history.

(56) References Cited

U.S. PATENT DOCUMENTS

| | | | |
|---|---|---|---|
| 4,200,770 A | | 4/1980 | Hellman et al. |
| 4,405,829 A | | 9/1983 | Rivest et al. |
| 4,642,424 A | * | 2/1987 | McNair ..................... 380/262 |
| 5,365,589 A | * | 11/1994 | Gutowitz ..................... 380/43 |
| 5,488,661 A | * | 1/1996 | Matsui ......................... 380/29 |
| 5,542,087 A | * | 7/1996 | Neimat et al. ................ 707/10 |
| 5,548,649 A | * | 8/1996 | Jacobson .................... 713/153 |
| RE36,310 E | | 9/1999 | Bjerrum et al. |
| 5,995,623 A | * | 11/1999 | Kawano et al. ............ 713/189 |
| 6,009,176 A | | 12/1999 | Gennaro et al. |
| 6,065,046 A | * | 5/2000 | Feinberg et al. ............ 709/216 |

* cited by examiner

*Primary Examiner*—Gilberto Barron
*Assistant Examiner*—Andrew L. Nalven
(74) *Attorney, Agent, or Firm*—Plevy, Howard & Darcy, PC

(57) ABSTRACT

A method and system of alternatively selecting an encryption key used to transmit a known number data bits and providing sufficient information to inform the receiving part of the selected encryption key is presented. In one embodiment of the invention, a plurality of encryption keys are available to the parties of the communication network. The transmitting party selects an encryption key used to encrypt a message block based on the data content of a previously transmitted message block. The receiving party, having received, and decrypted, a previously transmitted message block has sufficient information to determine the encryption key used to encrypt a subsequent data block and is able to decrypt the subsequently transmitted message.

12 Claims, 3 Drawing Sheets

METHOD AND SYSTEM FOR SELECTING ENCRYPTION KEYS FROM A PLURALITY OF ENCRYPTION KEYS

RELATED APPLICATION

This application relates to patent application Ser. No. 09/782,825 entitled, METHOD AND SYSTEM FOR SECURELY EXCHANGING ENCRYPTION KEY DETERMINATION INFORMATION, filed concurrently, herewith, and assigned to the same assignee as hereof.

FIELD OF THE INVENTION

The present invention relates to secure communication networks, more specifically to selecting encryption keys during a message transmission.

BACKGROUND OF THE INVENTION

Increased popularity and use of the communication networks have made possible new methods of doing business, marketing goods and providing services to consumers or users. To insure that sensitive information, such as business strategy, credit card numbers, social security numbers, bank account balances, medical records, etc., are not disclosed when transmitted over unsecured networks, sensitive data items are encrypted (or encoded). Methods of encrypting sensitive information are well known in the art. For example, in a secure communication network, one party may possess an encoding key that is used to encrypt sensitive data items, while the receiving party possess a corresponding decrypting key to return a received encrypted message to its original form. In this method, if the encoding or decoding key becomes known to parties outside the secure network, the entire system is compromised as unauthorized parties are also able to decrypt encoded messages. To prevent unauthorized access to sensitive information, encoding and decoding keys are continuously changed. However, continuously changing encoding and decoding keys is burdensome as it requires the redistribution of new keys to each authorized member. However, during the distribution process, communication among the parties is limited until the new keys are distributed to all authorized members.

Another method of encryption that reduces the burden of redistributing encoding/decoding keys is the use of a public-and-private key system. As is known, a public-and-private key system, a first party issues a non-secret public key, over a communication network, such as a the public telephone system (PSTN), private telephone system, Internet, etc., while retaining, secretly, a private key. The public key is accessible to all parties that have access to the network, while access to the private key is limited solely to the issuing party. Members of the secure communication network can then use a received public key and their own retained private key to generate an encryption key that can be used to encrypt sensitive informational data items. The encrypted sensitive informational data message, when received by the party issuing the public key, can then be decrypted using an encryption key generated from a previously received public key and the retained private key. Thus, sensitive information messages can be securely transmitted between parties without the necessity of transferring secure keys by other methods or coordinating the use of previously transferred secure keys. Public-and-private key systems are well known in the art. Details of their operation are disclosed in U.S. Pat. No. 4,200,770, entitled "Cryptographic Apparatus and Method," dated Apr. 29, 1980, to Hellmman, et al., and U.S. Pat. No. 4,405,829, entitled "Cryptographic Communication System and Method," dated, Sep. 20, 1983, to Rivest, et al.

However, the public-and-private key systems are subject to unauthorized access also. Public-and private key systems transmit public key parameters without the benefit of any security protection over unsecured networks. Hence, these initial parameters can be intercepted and used to attack the encryption key. Methods of attacking encryption keys, e.g., complex reverse mathematical algorithms, "brute force," etc., are also well known in the art and need not be discussed in detail herein. In these methods, the amount of encrypted data intercepted increases the chance of successfully determining the underlining encryption key. Consequently, a substantially long message may be successfully attacked and the security benefit of the encryption key can be lost.

One method to prevent the transmission of long messages using a single encryption key is to simply change the key during transmission. However, while the transmitting party may change the encryption key dynamically, the receiving party must be informed of the changed encryption key in order to decrypt subsequent messages. This places a burden on the parties as an indicator of a new key must be sent before the transmission. Hence, there is a need to dynamically change encryption keys during the transmission of substantially long messages and to provide the receiving party with knowledge of the encryption key used for the transmission without imposing burdens on the parties.

SUMMARY OF THE INVENTION

A method and system for selecting and assigning at least one encryption key from a plurality of encryption keys to a message or message data block is disclosed. In the method, a plurality of encryption keys are available to each party in a communication network. The transmitting party alternatively selects an encryption key from the available keys to encrypt messages blocks within a message. The alternate selection of encryption keys is continuously repeated for each message block. In accordance with one aspect of the invention, the alternatively selected encryption keys are selected using a known or pre-determined sequence. In a second aspect of the invention, the alternatively selected encryption keys are selected based on the data content of a message block. In this second aspect of the invention, the transmitting party selects a next encryption key based on message data content of a previously transmitted message block. The receiving party having decrypted the previously transmitted message block is able to determine the data content value and, consequently, the encryption key used to encrypt a next message block. Thus, the receiving party has knowledge of the encryption key used to transmit a message block without burdening the transmitting or receiving parties.

Figure 1:
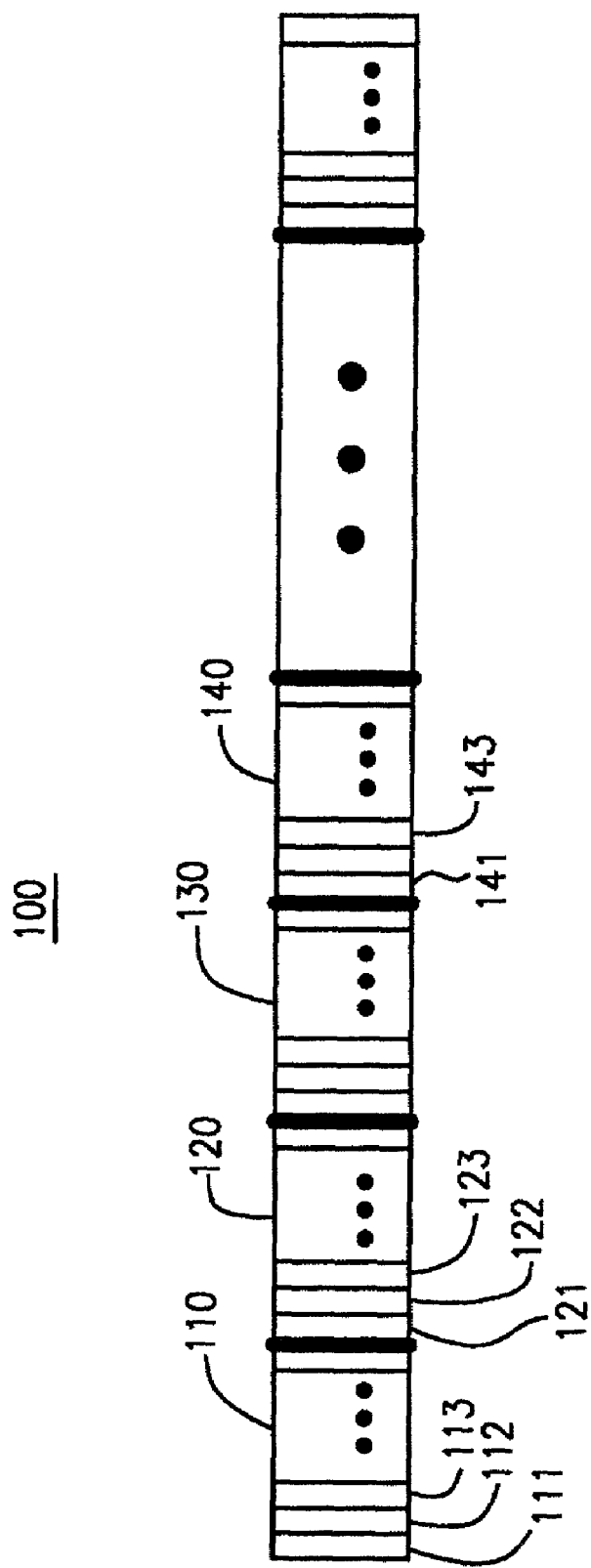
FIG. 1 illustrates an exemplary informational data message composed of N data blocks.

It is to be understood that these drawings are solely for purposes of illustrating the concepts of the invention and are not intended as a definition of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 illustrates a conventional informational message 100 composed of a plurality of data blocks, 110, 120, 130, etc. Each data block is composed of data bytes illustrated, for example, as data bytes 111, 112, etc., associated with data block 110, and as data bytes 121, 122, etc, associated with data block 120. Each data block further is composed of substantially equal number of data bytes. Composing a data message in this message block or data packet format, a transmitting party, in accordance with the principles of the invention, can encrypt each message block using an alternative selected encryption key.

Figure 2:
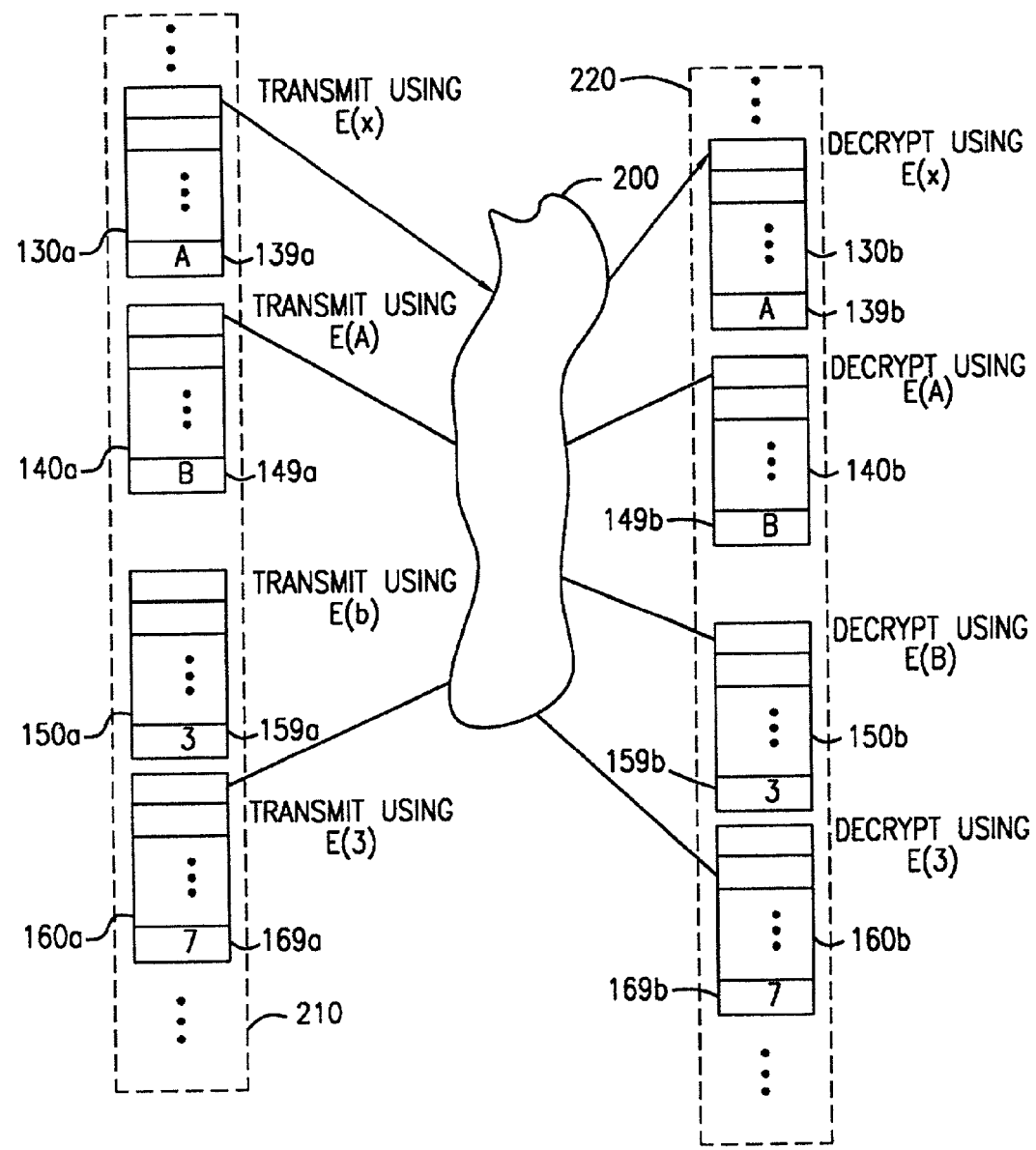
FIG. 2 illustrates an exemplary transmission and reception of data blocks in accordance with the principles of the invention.

FIG. 2 illustrates an exemplary transmission over network 200 of a informational data message, referred to as 210, by a transmitting party and the corresponding reception of the data message, referred to as 220, by a receiving party in accordance with the principles of the invention. In this illustrative example, the transmitted message is composed of message data blocks or data packets, 130a, 140a, 150a etc., which are similar to those illustrated in FIG. 1.

In this illustrative example, a transmitting party transmits an encrypted message block, e.g., block 130a, using an encryption key represented as E(x). Encryption key E(x), as will be explained, is determined from the data content of a previously transmitted message. In this illustrative embodiment of the invention encryption key E(x) is determined from the data content of a previous message block (not shown), e.g., message block 120 of FIG. 1. The receiving party having previously received message block 120, and decrypted same, has knowledge of the data content of block 120. Consequently, the receiving party can determine the encryption key that was used to encrypt message block, 130a, which is referred to as received data packet 130b. The received message block 130b is thus decrypted using a decryption key corresponding to encryption key, E(x).

For each subsequent transmission, the transmitting party extracts a known number of data bits from at least one known data byte within a message block and uses the extracted value to select a next encryption key. In this illustrative example, the value of the last data byte, represented as data byte 139a, is extracted to determine the encryption key used encrypt the next message block, i.e., data packet 140a. In this case, the content of data byte is represented as "A." Message block 140a is, thus, encrypted and transmitted using an encryption key, represented as E(A). As would be appreciated, the receiving party, having previously decrypted the data content of received message 130b, has knowledge of the encryption key selected by the transmitting party to transmit message block 140a. In this case, the data content of the last data byte 139b, is thus used to determine the encryption key selected to transmit message block 140a. Accordingly, the receiving party is able to decrypt message block 140b using the encryption key determined from the data content of previously transmitted message block 130a.

For the next data block, represented as block 150a, the transmitting party again determines a next encryption key by extracting a known number of data bits from at least one known data byte within message block 140a. In this illustrative example, the value of last data byte 149a of message block 140a is extracted. Message block 150a is then encrypted using encryption key represented as E(B). The receiving party, having received and decrypted the data content of message 140b, has knowledge of the encryption key selected to transmit message block 150, i.e., E(B). Accordingly, the receiving party has sufficient knowledge to determine the encryption key and decrypt received message block 250b.

The process of selecting an alternative encryption keys as a function of the data content of a previously transmitted message block is continuously repeated for each transmitted message block or data packet in the data message.

Figure 3:
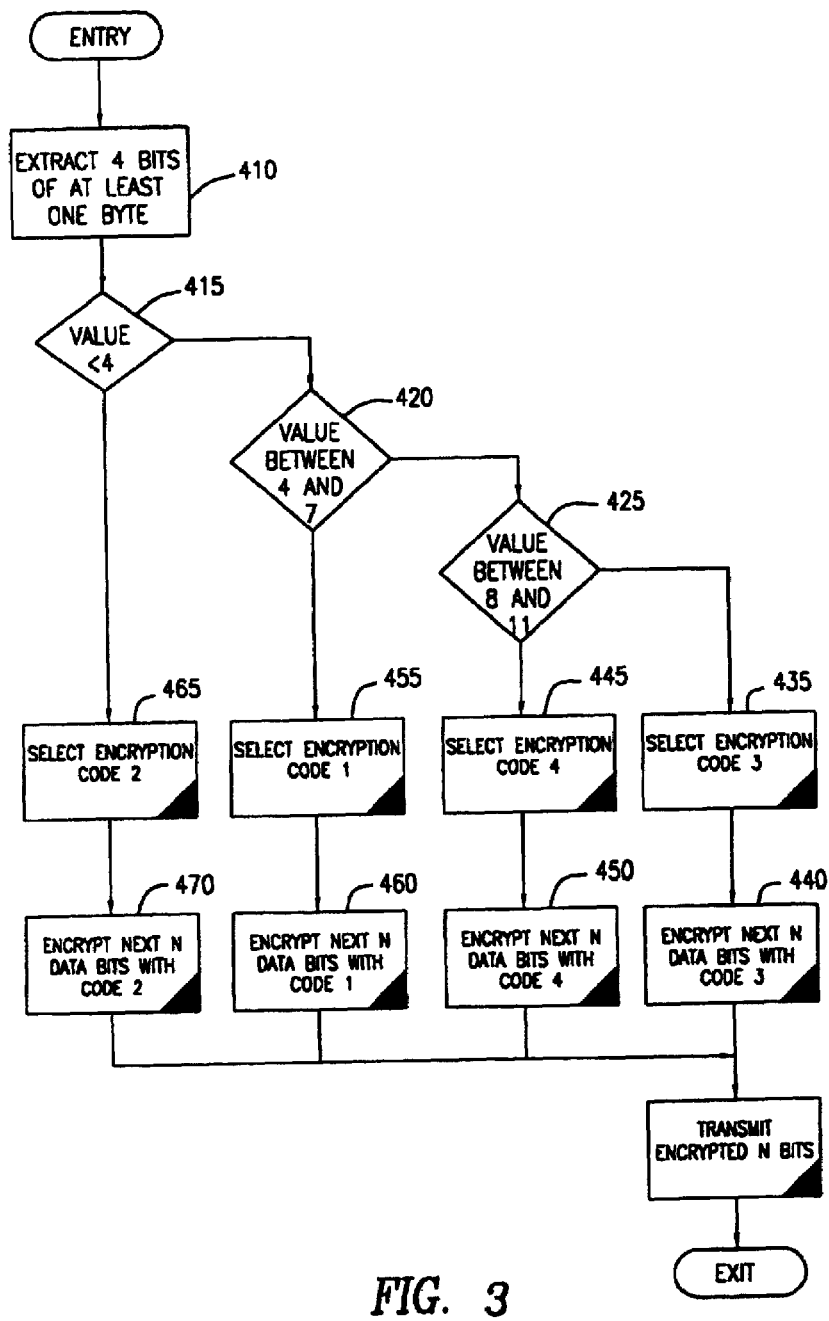
FIG. 3 illustrates a flow chart showing an exemplary processing in accordance with the principles of the invention.

FIG. 3 illustrates an exemplary flow chart of the processing to alternately select an encryption key to encrypt data blocks or packets for transmission. In this exemplary process, each party have available a number of encryption keys and their respective order. In this exemplary example, four encryption keys, labeled Code 1, Code 2, Code 3 and Code 4 are available to encrypt and decrypt message data blocks. Further, it is known between the parties, the number and location of data bits in each data block used to determine a data value. In this case, the transmitting party extracts a known number of data bits from a known position within a message data block at block 410.

In this illustrative example, four data bits are selected from a first byte of a message data block and the 16 values of the extracted four data bits are mapped into the four available encryption keys. As would be appreciated, any number bits or combination of bits within a message data block may be selected and mapped into encryption keys. In another aspect of the invention, data bits can be selected from a single location or a plurality of locations within the data message. In a preferred embodiment, at least four data bits are extracted from a last data byte.

At block 415 a determination is made as to whether the value of the extracted data content is less than four. If the determination is in the positive, then one of the encryption keys is selected, at block 465. In this illustrative example, encryption Code 2 is selected. The next "N" bytes, for example, 256 bytes, in the data message are encrypted, at block 470, using encryption Code 2. As would be appreciated, the next "N" data bits can correspond to a single data packet or a plurality of data packets. The receiving system, thus, alternatively switches to a alternative encryption key after "N" bytes have been received. In the example, illustrated in FIG. 2, the number of data bytes is comparable to the number of bytes of a message block.

Returning to FIG. 3, if the determination, at block 415, however, is in the negative, then a determination is made, at block 420, as to whether the value of the data bits is between four and seven. If the determination is in the positive, then one of the encryption keys is selected, at block 455. In this illustrative example, encryption Code 1 is selected. The next "N" bytes are then encrypted at block 460 using encryption Code 1. In one embodiment of the invention, 256 bytes may be encrypted with the selected encryption key or code.

If the determination, at block 420, however is in the negative, then a determination is made, at block 425 as to whether the value of the extracted data bytes is between eight and eleven. If the determination is in the positive, then one of the encryption keys is selected at block 445. In this illustrative example, encryption Code 4 is selected and the next "N", data bytes are encrypted using encryption Code 4 at block 450.

If the determination at block 425 is in the negative, then encryption Code 3 is selected and the N bytes of the message are encrypted using encryption key 3 at block 440.

In a second embodiment of the invention, the selection of alternate encryption keys can be determined using known modulo-arithmetic algorithms. That is, the extracted data content value can be mapped into the number of available keys by using modulo arithmetic. Table 1 depicts three examples of encryption key selection order in which eight data values i.e., 3 data bits, are mapped into three available encryption keys using a modulo-3 algorithm. In the first example, tabulated in Column 3 of Table 1, the order of encryption keys is selected such that a data content value of zero selects a first encryption key of a three-key encryption key system. In the second example, tabulated in Column 4 of Table 1, the order of encryption keys is selected such that a data content value of zero selects a third encryption key of a three-encryption key system. In a third example, tabulated in the fifth column of Table 1, the order of encryption key selection is such that one particular encryption key is made available more often that other encryption keys. As would be appreciated, the order of encryption key selection is agreed to by the parties or an authorizing agent of the parties. Furthermore, the mapping of a known number of data bits to corresponding encryption keys using the method illustrated in FIG. 3 or modulo-arithmetic limits the range of the data value.

TABLE 1

Modulo-Arithmetic Selection of Encryption Keys

| Data Content Value | Modulo-3 Value | Encryption Key Selection Example 1 | Encryption Key Selection Example 2 | Encryption Key Selection Example 3 |
|---|---|---|---|---|
| 0 | 0 | E(1) | E(3) | E(3) |
| 1 | 1 | E(2) | E(1) | E(2) |
| 2 | 2 | E(3) | E(2) | E(3) |
| 3 | 0 | E(1) | E(3) | E(1) |
| 4 | 1 | E(2) | E(1) | E(3) |
| 5 | 2 | E(3) | E(2) | E(2) |
| 6 | 0 | E(1) | E(3) | E(3) |
| 7 | 1 | E(2) | E(1) | E(1) |

Although, the principles of the invention in selecting alternate encryption keys, or codes, have been illustrated using exemplary mapping of a data content having 16 data values into four encryption keys, as in FIGS. 3, and 8 values into three encryption keys, as in Table 1, it would be appreciated by those skilled in the art that the data content value or the number of encryption keys may be significantly altered without adversely altering the encryption key selection process. Further still, it would be understood that the location, and the number, of data content bytes may also be altered substantially without adversely affecting the encryption key selection process.

In one embodiment of the invention, a first information item may be transmitted in an unencrypted manner. The data content of at least one data byte in this first information item may then be used to determine an encryption key for encrypting a next data message block. In this case, only a single information item is transmitted over an unsecured network without the benefit of security protection. For example, in a public key/private key information exchange between parties, initial information items, such as public key and synchronizing indicator, are transmitted without the benefit of encryption. These information items are used to determine encryption keys between the transmitting and receiving parties. The data content of at least one data byte of a synchronizing indicator, for example, can then be selected to determine a first encryption key to transmit a first data message block. As an initial synchronizing indicator is transmitted unencrypted in accordance with the principles of public key/private key exchange, the receiving party has sufficient information to determine which first encryption key is used to encrypt a first data message, without requiring any special transmissions or exchanges. The first received data message, thus, can be decrypted without imposing a burden on the receiving party. Determining a first encryption key without requiring special transmissions or exchanges is advantageous as the unencrypted information item is not highlighted in any special transmission message.

In a second embodiment of the invention, the first encryption key determined from a first public key and a first encrypted MI.

While there has been shown, described, and pointed out, fundamental novel features of the present invention as applied to preferred embodiments thereof, it will be understood that various omissions and substitutions and changes in the methods described, in the form and details of the devices disclosed, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated.

We claim:

1. A method to encrypt a data message having a plurality of message data blocks prior to transmitting said message data blocks over a network, said method comprising:
   extracting data values from at least two of said message data blocks;
   selecting encryption keys from among a plurality of encryption keys dependently upon said extracted data values, respectively; and,
   encrypting subsequent ones of said message data blocks using said selected encryption keys, respectively.

2. The method of claim 1, wherein said extracted data value is determined using a known number of bits.

3. The method of claim 2, wherein said known number of bits are distributed among at least one data byte of said one of said message blocks.

4. The method of claim 2, wherein said known number of bits are located in a first byte of said one of said message blocks.

5. The method of claim 2, wherein said known number of bits are located in a last byte of said one of said message blocks.

6. The method of claim 1, wherein said step of extracting further comprises limiting said extracted data value to a known range.

7. The method of claim 6, wherein said known range is determined using modulo-arithmetic.

8. The method of claim 6, wherein said known range is associated with a number of said stored encryption keys.

9. A method to encrypt a data message having a plurality of message data blocks prior to transmitting said message data block over a network, said method comprising:
   extracting a data value from at least one of said message data blocks;
   selecting an encryption key from among a plurality of encryption keys dependently upon said extracted data value; and encrypting at least a subsequent one of said message data blocks using said selected encryption key;

wherein said extracting, selecting and encrypting are iteratively repeated for others of said message data blocks.

10. The method of claim 9, further comprising:

receiving each of said encrypted message data blocks;

decrypting each said received, encrypted message data block using a key based on a prior received message data block;

extracting a data value from each said decrypted massage data block.

11. The method of claim 10, wherein each said received message block corresponds to at least one unencrypted message data block.

12. The method of claim 10, wherein said received message data block corresponds to a synchronizing indicator.

* * * * *